United States Patent [19]

Rottmayer

[11] Patent Number: 5,809,637
[45] Date of Patent: Sep. 22, 1998

[54] METHOD OF MAKING A MAGNETIC HEAD ASSEMBLY WITH WRITE POLE/SHIELD STRUCTURE

[75] Inventor: Robert Earl Rottmayer, Fremont, Calif.

[73] Assignee: Read-Rite Corporation, Milpitas, Calif.

[21] Appl. No.: 693,441

[22] Filed: Aug. 7, 1996

Related U.S. Application Data

[63] Continuation of Ser. No. 112,356, Aug. 27, 1993, abandoned.

[51] Int. Cl.⁶ ................................................ G11B 5/127
[52] U.S. Cl. .................................... 29/603.15; 29/603.14; 29/603.18; 216/22
[58] Field of Search .......................... 29/603.13, 603.14, 29/603.15, 603.16, 603.18; 204/192.35; 216/22, 48; 360/113, 122

[56] References Cited

U.S. PATENT DOCUMENTS

| | | | |
|---|---|---|---|
| 4,791,719 | 12/1988 | Kobayashi et al. | 29/603.14 |
| 4,803,580 | 2/1989 | Mowry | 360/113 |
| 5,116,719 | 5/1992 | Gau | 360/122 X |
| 5,141,623 | 8/1992 | Cohen et al. | 216/22 X |
| 5,168,409 | 12/1992 | Koyama et al. | 360/113 |
| 5,438,747 | 8/1995 | Krounbi et al. | 29/603.16 |

*Primary Examiner*—Peter Vo
*Attorney, Agent, or Firm*—Blakely Sokoloff Taylor & Zafman, LLP

[57] ABSTRACT

A read/write magnetic head assembly includes an inductive write head and a magnetoresistive (MR) read head. The inductive write head includes first and second magnetic poles, P1 and P2 respectively, which form a magnetic circuit with a write transducing gap. The P1 pole is formed in an integral structure with a wider extending flux shield section. The shield section extends from the lower surface of the P1 layer to define a stepped or staggered configuration. The MR head includes an MR sensor element that is disposed between a lower flux shielding layer and the P1 pole/shield section structure. The narrow width of the P1 pole layer at the write gap region and the extended shield section of the integral P1 pole/shield structure serve to reduce the write fringing field which occurs during the write mode. In this way, the recorded data tracks can be narrowed with a resultant increase in track density.

1 Claim, 6 Drawing Sheets

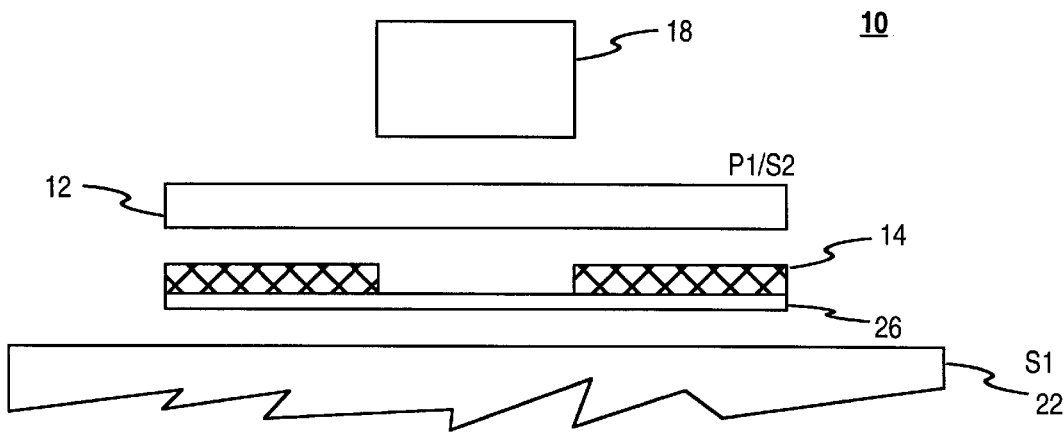
FIG. 1 *(PRIOR ART)*
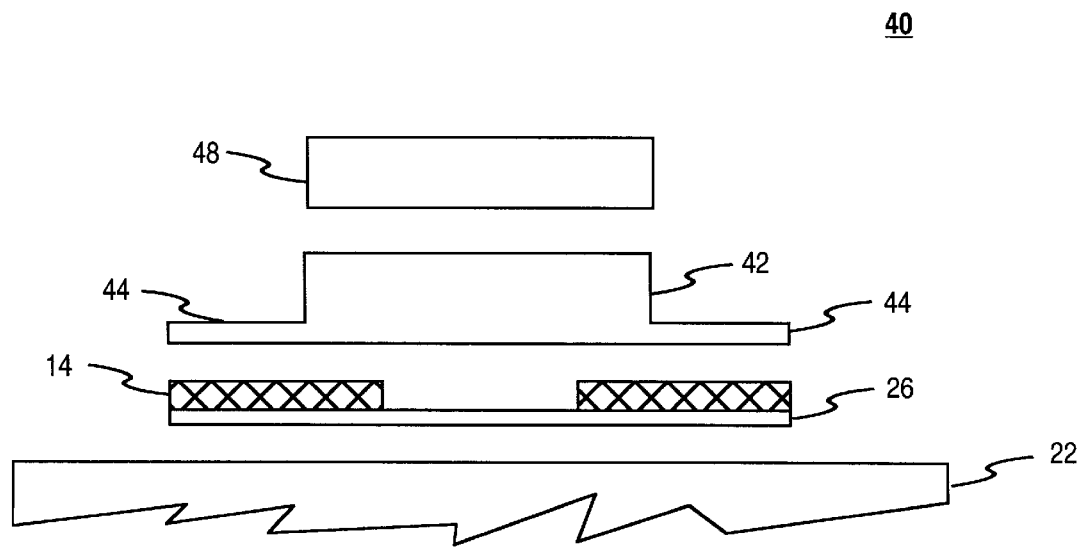
FIG. 2

METHOD OF MAKING A MAGNETIC HEAD ASSEMBLY WITH WRITE POLE/SHIELD STRUCTURE

This is a continuation of application No. 08/112,356 filed: Aug. 27, 1993 now abandoned.

FIELD OF THE INVENTION

This invention relates to a thin film magnetic head assembly and in particular to a read/write head or transducer incorporating a magnetoresistive sensing read element.

DESCRIPTION OF THE PRIOR ART

Presently known magnetic head assemblies are fabricated with an inductive write head and a magnetoresistive (MR) read element. Typical inductive write heads incorporate thin film Permalloy layers, designated as P1 and P2 respectively, that form a magnetic circuit with a transducing gap, as is well known. During the write mode, magnetic flux representative of a data signal emanates from the write gap and a signal is registered on a rotating disk that is close to the write gap. It is known that there is undesirable fringing flux associated with the write magnetic field. Such fringing flux from the write field has a deleterious effect in that there is a limit on the width of the data tracks that can be written and accordingly a limit on the track density or tracks per inch. It is desirable to contain such fringing flux so that data track density can be increased.

One prior art approach that addresses the problem of fringing flux is to use a shield/pole element, such as described in U.S. Pat. No. 4,803,580. The shielding is effective both against the inductive field from the P1 and P2 poles and against the fringing field of the adjacent tracks on the surface of the storage disk. In the patented device, the shield/pole element, which includes the first deposited P1 layer and a PERMALLOY shield, is formed as a very wide structure wherein the P1 pole layer and the shield are of the same thickness.

In disk drives using rotary actuators, skew of the magnetic head as the head is moved from inner radius tracks to outer radius tracks is a factor to be considered. As the spacing between the write gap and the read gap is reduced, the adverse effect of skew is also reduced.

SUMMARY OF THE INVENTION

An object of this invention is to provide an improved thin film magnetic head assembly effectively reduces fringing flux during the write mode and which allows the recording of data with higher track density.

Another object of this invention is to provide a thin film magnetic head assembly having an inductive write gap and an MR read gap that are closely spaced to compensate for head skew.

Another object is to provide a thin film magnetic head assembly including an MR sensor element that is shielded from the magnetic field including fringing flux generated during the write mode.

In accordance with this invention, a thin film read/write magnetic head assembly includes an inductive write head and a magnetoresistive read head formed with an MR sensor element. The inductive head includes first and second poles designated as P1 and P2 layers respectively made of a ferromagnetic material such as Permalloy, which form a magnetic circuit with a transducing write gap. In keeping with this invention, an integral stepped structure is provided that includes the P1 pole layer and a shield section, preferably made of PERMALLOY) that extends from the lower portion of the P1 pole. The MR sensor element is disposed between a lower shielding layer and the integral P1 pole/shield section stepped structure. The width of the shield section shield is equal to or greater than the width of the P1 write pole that is located above the shield section. It is known that the write fringing field is determined by the top surface of the P1 layer in the region of the write transducing gap formed between the P1 layer and the second deposited P2 pole layer. The reduced width of the P1 pole at the air bearing surface of the air bearing slider, which supports the the thin film magnetic head, relative to the width of extending shield portion S2 causes a reduction in the side fringing of the write field that is induced by the inductive write pole pair P1 and P2. The side fringing flux would appear as skewed side transitions at the edge of the data track being written. For a given track spacing, the undesirable signal from the side of the adjacent track transition will be reduced. The reduction in the write fringing field results in improved data signal recording and allows the data tracks to be narrower thereby yielding higher track density.

BRIEF DESCRIPTION OF THE DRAWINGS

The invention will be described in greater detail with reference to the drawings in which:

FIG. 1 is a cross-sectional view of a prior art thin film read/write head assembly, shown in part, having an elongated write/shield pole structure;

FIG. 2 is a cross-sectional view of a thin film read/write head assembly, shown in part, with a stepped P1 pole/shield structure, made in accordance with this invention;

DETAILED DESCRIPTION OF THE INVENTION

Figure 3:
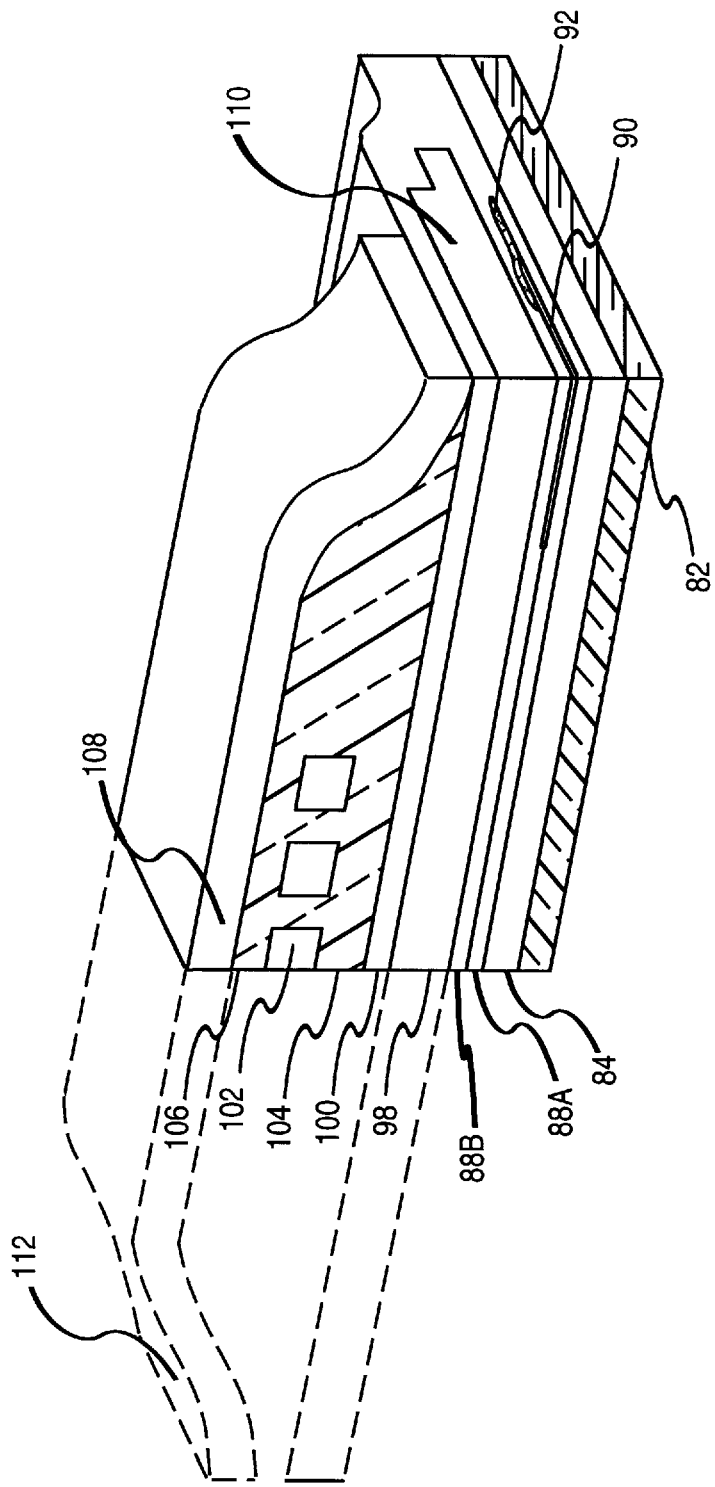
FIG. 3 is a perspective view of a read/write head assembly, shown in part, illustrating the novel head assembly of FIG. 2.

As illustrated in FIG. 1, a prior art read/write magnetic head 10 includes an inductive portion having a layer including a P1 pole and a magnetic shield 12. The P1 pole and the shield are formed in a single layer of constant thickness. An MR sensor read element 26, with electrical leads 14, is located below the lower surface of the P1 pole/shield structure. A second shield 22 is provided below the MR element 26. An example of a prior art read/write head of this type is described in U.S. Pat. No. 4,803,580 which uses a P1 pole and an adjacent shield in a single layer, both the pole and the shield having the same thickness in a relatively wide pole/shield structure. The top surface of the P1 pole layer spaced from the bottom of the P2 pole layer 18 defines the extent of the write fringing field. In the patented device, the wide P1 pole piece results in a greater fringing field that causes the track density to be reduced. Also the spacing between the inductive gap defined by the relatively thick P1 pole/shield layer described in the patent and the MR element necessitates wider recorded data tracks with resultant lowered track density.

During operation of a disk drive, the read/write head or transducer 10, which is supported by an air bearing surface of an air bearing slider, flies close to a rotating magnetic disk, as is well known in the art. As the head is moved from the inner diameter to the outer diameter, significant skew variations occur. If the spacing between the write transducing gap and the read gap is unduly large, the problem of skew becomes more significant.

As illustrated in FIG. 2, a read/write head structure 40 is formed with a P1 pole layer 42 and a P2 pole layer 48. The P1 pole is formed with a magnetic extended shield section 44 at the lower portion of the P1 layer 42 to provide a stepped configuration of a P1 pole/shield section structure, in accordance with this invention. An MR element 26 having an active region is located below extended shield section 44 for reading data recorded by the inductive head. A second shield 22 is disposed below the MR element 26 to provide additional shielding. The pole layers, shields and MR element are preferably made of PERMALLOY.

The shared pole/shield structure offers a significant reduction in the magnitude of the fringing field developed during the write mode. The stepped configuration of the pole/shield structure with a narrower P1 layer and smaller top surface of the P1 pole in the region of the write gap reduces the amount of the fringing field. Therefore, the recorded data tracks can be made narrower and the tracks can be more closely spaced with a resultant increase in recording track density. Since the amount of flux carried by the extension of extended shield section 44 of the pole/shield structure is relatively small, a seed layer of enhanced thickness or a thin plated layer can-be used to form the shield section 44.

Furthermore, the extended shield section 44 in combination with the lower shield 22 provide an effective shielding to the MR element 26, particularly when the lower shield 22 is very wide and extends beyond the widths of the MR element 26 and the upper shield. The lower shield 22 is made sufficiently wide and the MR element 26 is made wide enough to obtain a desired track width and longitudinal bias. An upper portion of extended shield 44 may be longer or shorter than the MR element due to the shielding effect of the lower shield 22. The P1 layer 42 is narrower than the bottom shield and its width is as close to the width of the P2 layer 48 as manufacturing tolerances allow.

The shielding provided by the extension of the shield section of the integrated stepped structure and the extended first shield will be reflected in the performance of the MR read head. The additional shielding effect of the extended shield section 44, as embodied in this invention, improves head sensitivity, noise performance, pulse width and side reading.

With reference to FIG. 3, a read/write head assembly is made with a substrate 82 of insulating material, such as a composite of alumina-titanium-carbide, for example. A soft magnetic layer 84 such as PERMALLOY, is deposited over the nonmagnetic substrate 82 by evaporation, sputtering, or plating for example. A first insulating layer 88A, of a suitable nonmagnetic material such as $Al_2O_3$, is deposited thereon to form a read gap. An MR sensor layer 90 is then deposited on insulating layer 88A. Longitudinal biasing material, such as FeMn exchange material, may then be deposited. Photolithographic and etching means are used to define MR element 90 and its leads 92 near an air bearing surface (ABS) 110 of an air bearing slider supporting the read/write head assembly.

Electrical contacts are deposited and patterned to form connections to interconnects at opposed ends of MR element 90 which are connected to a sense current source and voltage sense means. The electrical leads and bias materials may be patterned simultaneously. The leads may be completed in one or more patterning steps.

A second insulating layer 88B of $Al_2O_3$ is deposited over the MR element 90 to complete the read gap. Next a shared read/write pole/shield structure 98, made of a suitable soft magnetic material such as PERMALLOY is formed by sputtering, evaporation, plating or other suitable means on the second alumina insulating layer 88B. The stepped configuration of the P1 pole/shield structure 98 is formed by suitable process sequences, which will be described below. A third insulating layer 100, such as $Al_2O_3$, is deposited over the shared pole/shield structure 98 of sufficient thickness to form a write transducing gap 100. A conductive coil 102, with a suitable number of turns of copper or other suitable material, is then deposited and patterned and embedded in layers 104, 106 of insulating material, which may be a hard baked photoresist. A P2 write pole 108 of PERMALLOY is then formed over the insulating material 106. As shown with dashed lines in FIG. 3, the P2 pole 108 contacts the P1 pole 98 at a back closure 112 to form a continuous magnetic circuit. An insulating protective overcoat (not shown) is provided over the P2 pole 108.

The MR read gap 88A, 88B will be typically under 1 micron, and he write gap 100 will also be typically under 1 micron.

Figure 4A:
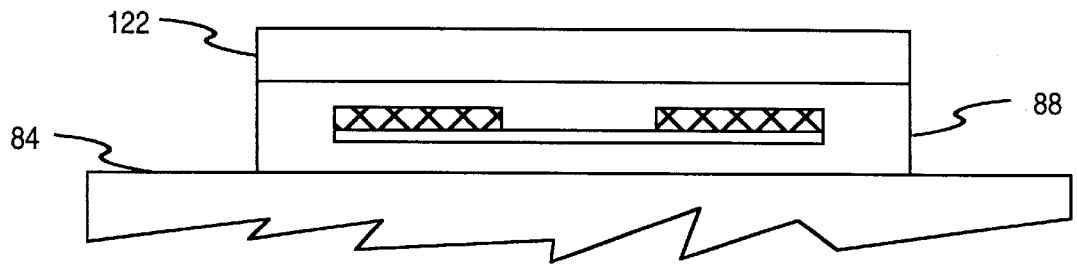
FIGS. 4 A–D depict the steps of making a thin film read/write head structure, in accordance with this invention, by sequential plating and photoresist operations.
Figure 4B:
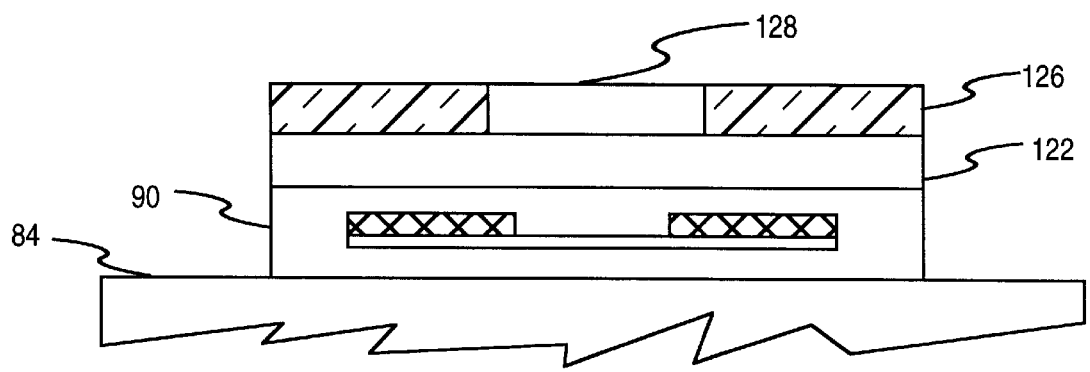

Methods for forming the stepped write pole/shield structure 98 of FIG. 3 will now be described with reference to FIGS. 4A–D and 5. FIGS. 4A–4D display an exemplary sequence of photoresist and deposition steps which form the extending shield section 122 of the P1 write pole 128, in accordance with this invention. In this process, a conductive seed layer is deposited on the second read gap 88. A photonresist layer is then deposited to define a window which aligns with the MR sensor element 90. To form the shield section 122, a soft magnetic material layer, such as Permalloy, is plated on the conductive seed layer to a predetermined thickness, A typical thickness would be in the range of 1 to 10 microns. A second photoresist pattern 126 is deposited and defines a centered window over magnetic layer 122, as shown in FIG. 4B. This window pattern 126 defines the distance by which the subsequently deposited soft magnetic layer portion 128 will be symmetrically overlapped by the extension 122. The second soft magnetic layer is deposited up to a predetermined thickness of about 1–3 times the length of the write transducing gap to form the P1 write pole portion 128.

Figure 4C:
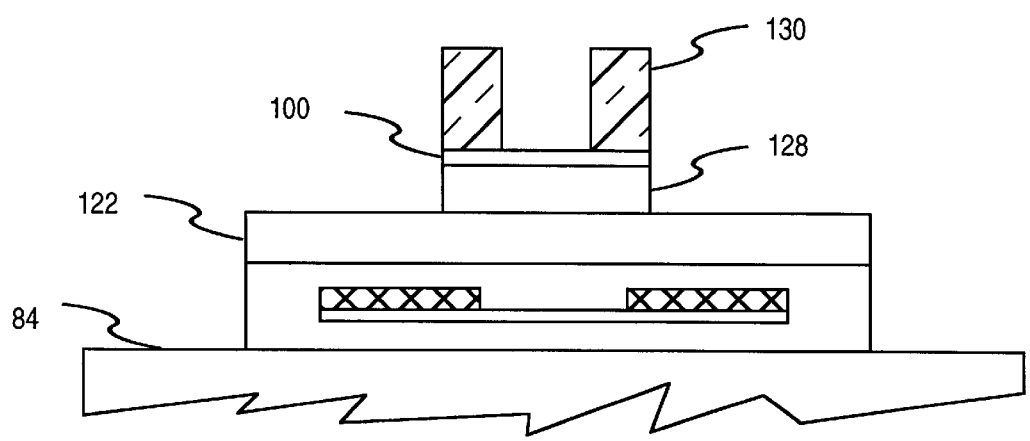
Figure 4D:
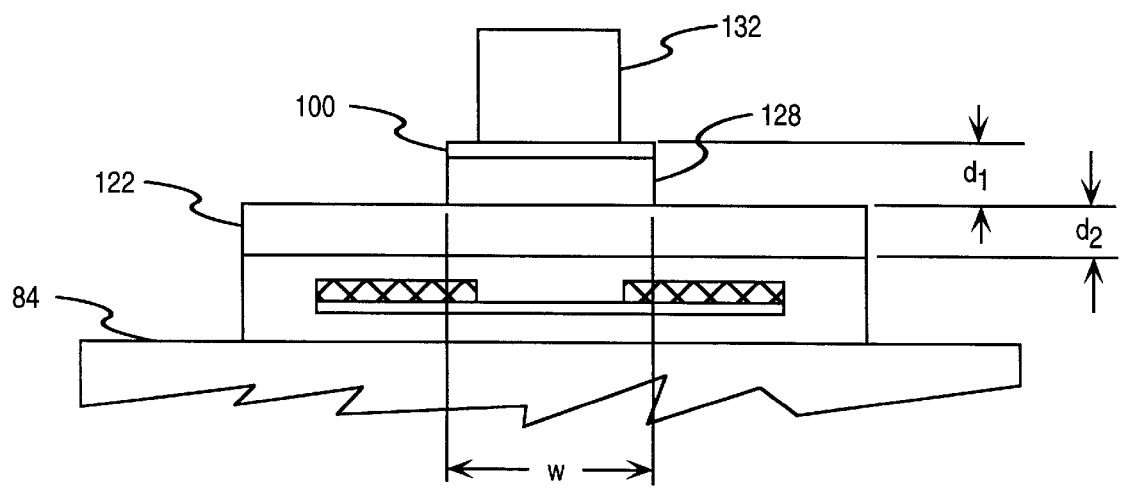
Figure 5A:
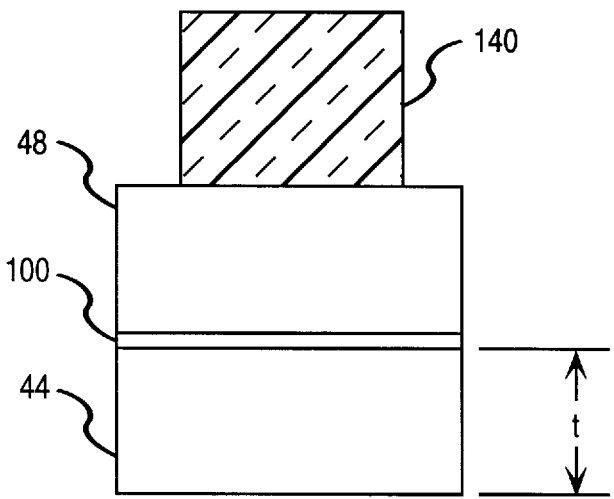
FIGS. 5A–C illustrate a structure made in accordance with this invention, by ion-milling or etching a sequentially deposited series of layers.
Figure 5B:
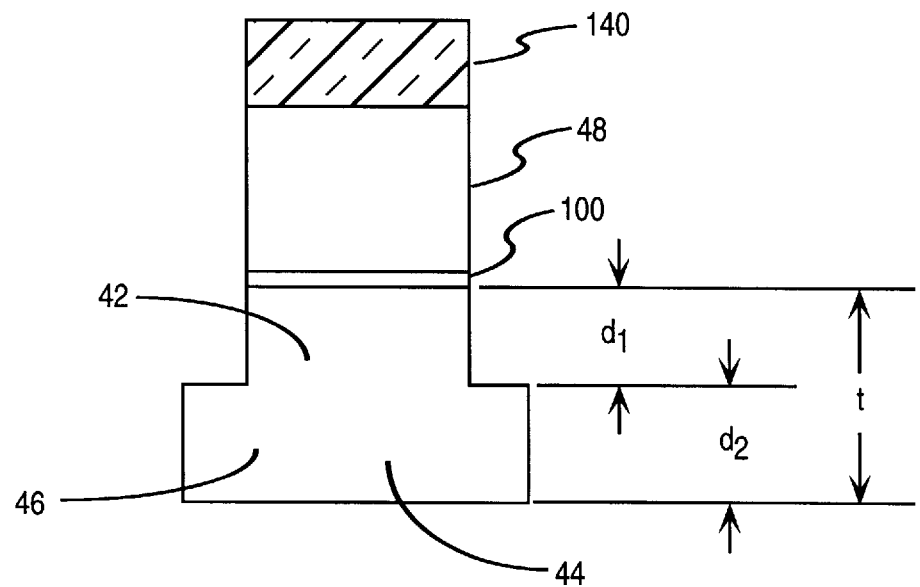
Figure 5C:
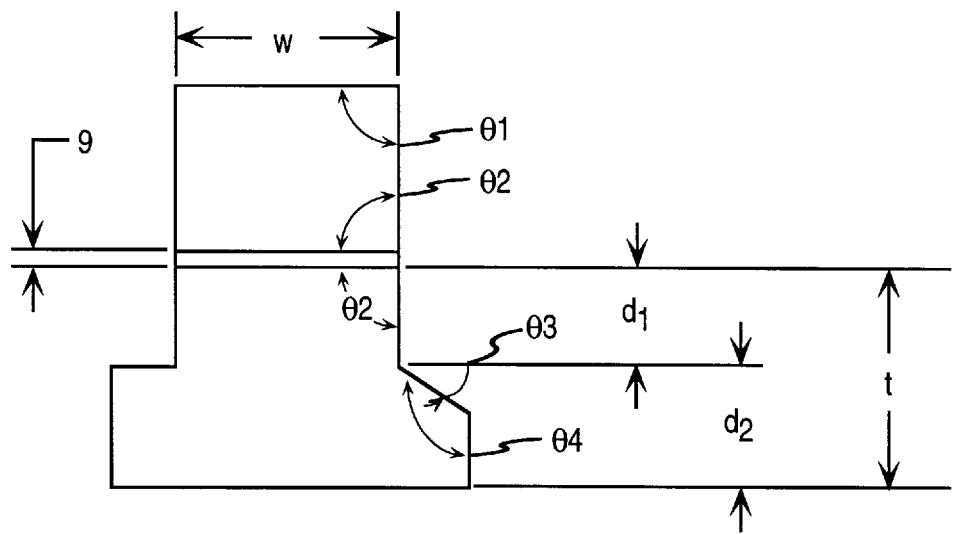

As illustrated in FIGS. 4C and 4D, a write transducing gap is formed by an insulating layer 100, such as $Al_2O_3$, that is deposited over the P1 pole 128 and then followed by another seed layer. A third photoresist pattern defines a third window. A final layer of Permalloy is then deposited into the window 130 up to a desired thickness to form the P2 write pole 132. The final thicknesses of heights d1, d2 and the width w indicated in FIG. 4D are chosen to minimize write fringing fields and maximize shielding of the MR element while keeping the read/ write gap spacing to a minimum. Preferred values for $d_1$ are about 1–3 times the gap length and for w about 0–1.5 microns greater than the P2 width. An alternate method of forming the structure of the stepped shared write pole/shield structure, in accordance with this invention, is illustrated in FIGS. 5A–5C. P1 layer 42 and extended shield section 44, which in one embodiment are ferromagnetic layers, are deposited to a total thickness t on an insulating substrate (not shown). An insulating material 100, such as $Al_2O_3$, is deposited over the ferromagnetic P1 layer 42 to form a write gap. As described with reference to FIG. 3, coils 102, insulator layers 104, 106, and the back closure between P2 layer 48 and P1 layer 42 are formed. A final masking layer 140, using a photoresist or Ti or other suitable material, is deposited and patterned. As an alternative, the P2 pole layer can be made thicker during manufacture than the final thickness of the P2 layer, thereby providing a self-aligning mask and precluding the need for a separate masking step. Etching, by an ion beam or reactive ion etching for example, removes the P2 layer 48, the write gap insulating material 100, and a portion of the P1 layer 42. These layers are removed where exposed by the photoresist patterning of layer 140. Etching is continued until layers 48 and 100 are completely penetrated. Etching is stopped midway through the ferromagnetic layers that include P1 layer 42 and extended shield section 44 leaving a shared pole/shield structure that includes P1 layer 42 and extended shield section 44 44 with a nonuniform cross-section having a write pole portion, P1 layer 42, of thickness d1, extended shield section 44 of thickness d2 having an extension of width w defined at the write gap. Some slight outward slope of the resulting structure may result from the diverging effect of the ion beam used for etching.

By virtue of this stepped configuration in which the upper part of a shield section forms the bottom pole of an inductive write structure, the effects of write field fringing flux are effectively reduced. The reduced fringing affords higher track density during the recording mode of a disk drive. The arrangement of the P1 and P2 poles and flux sensing MR element, with the shared P1 pole and shield section structure, makes possible a closer spacing of the read and write gaps. The extended shield 84 enhances the shielding effect allowing the shield 122 to be less critical.

With reference to FIG. 5C, the following dimensions are preferred for fabricating the structure disclosed herein using ion milling:

| | |
|---|---|
| $60° < \Theta_1 \leq 90°$ | $0° < \Theta_3 \leq 30°$ |
| $76° < \Theta_2 \leq 90°$ | $\Theta_4 \geq 90°$ |
| $1\,g \leq d_1 \geq 3\,g$ | | where g is the thickness of the write gap.

In an implementation of the invention, the thickness of the magnetic shield section associated with the P1 pole in a stepped configuration is in the range of about 0.5–1 micron and similarly the magnetic shield layer disposed below the MR sensor is in the approximate range of 0.5–1 micron.

What is claimed is:

1. A method of making a read/write magnetic head having a magnetoresistive (MR) read head and a write head, the magnetic head being bounded in part by an air bearing surface (ABS), the method comprising the steps of:

depositing at least one magnetic layer to form a second shield layer of the MR read head for forming a first pole piece of the write head, the at least one magnetic layer extending from the ABS to and including a back closure;

depositing a second magnetic layer above the at least one magnetic layer for forming a second pole piece above the to be formed first pole piece from the ABS to and including the back closure, the second to be formed pole piece being formed with a second pole tip element; and, etching the at least one magnetic layer and the second magnetic layer to vertically partially notch the at least one magnetic layer, thereby forming the first pole piece in alignment with the second pole piece and forming the first pole piece into an integral stepped pole/shield structure.

* * * * *